United States Patent [19]

Douglas et al.

[11] Patent Number: 4,838,565
[45] Date of Patent: Jun. 13, 1989

[54] ROLLING TRAVOIS

[75] Inventors: George V. Douglas; Vivian T. Douglas, both of Wheat Ridge, Colo.

[73] Assignee: Douglas & Douglas, Inc., Wheat Ridge, Colo.

[21] Appl. No.: 130,078

[22] Filed: Dec. 8, 1987

[51] Int. Cl.⁴ .............................................. B62D 51/04
[52] U.S. Cl. ...................... 280/1.5; 172/350; 172/353; 224/184; 280/78; 403/118
[58] Field of Search ...................... 280/1.5, 8, 9, 47.17, 280/47.26, 47.27, 47.3, 638, 645, 648, 658, 757, 78, 47.32; 172/353, 350, 370, 537, 539; 403/118; 224/153, 158, 184, 224, 266

[56] References Cited

U.S. PATENT DOCUMENTS

| | | | |
|---|---|---|---|
| 1,040,413 | 10/1912 | Renard | 224/153 |
| 2,613,953 | 10/1952 | Giovannoni | 280/1.5 |
| 2,624,588 | 1/1953 | Jones | 280/9 |
| 2,655,957 | 10/1953 | Lagant | 30/388 |
| 2,992,834 | 7/1961 | Tidwell et al. | 280/47.3 |
| 3,046,031 | 7/1962 | Reynolds | 280/8 |
| 3,328,043 | 6/1967 | Johnson | 280/1.5 |
| 3,336,037 | 8/1967 | Brozovich | 280/9 X |
| 4,045,040 | 8/1977 | Fails | 280/1.5 |
| 4,236,723 | 12/1980 | Lemmon | 280/1.5 |

FOREIGN PATENT DOCUMENTS 36994  7/1968  Finland ................... 172/537

Primary Examiner—Mitchell J. Hill
Attorney, Agent, or Firm—Bill D. McCarthy

[57] ABSTRACT

A rolling travois for pulling camping supplies and the like behind an individual, the rolling travois comprising an elongated support frame having one end mounted on a single enlarged roller made up of a plurality of individual cylindrical disks. The other end of the support frame has an outwardly extending tongue pivotally attachable to a backpack frame worn by the individual pulling the rolling travois.

8 Claims, 2 Drawing Sheets

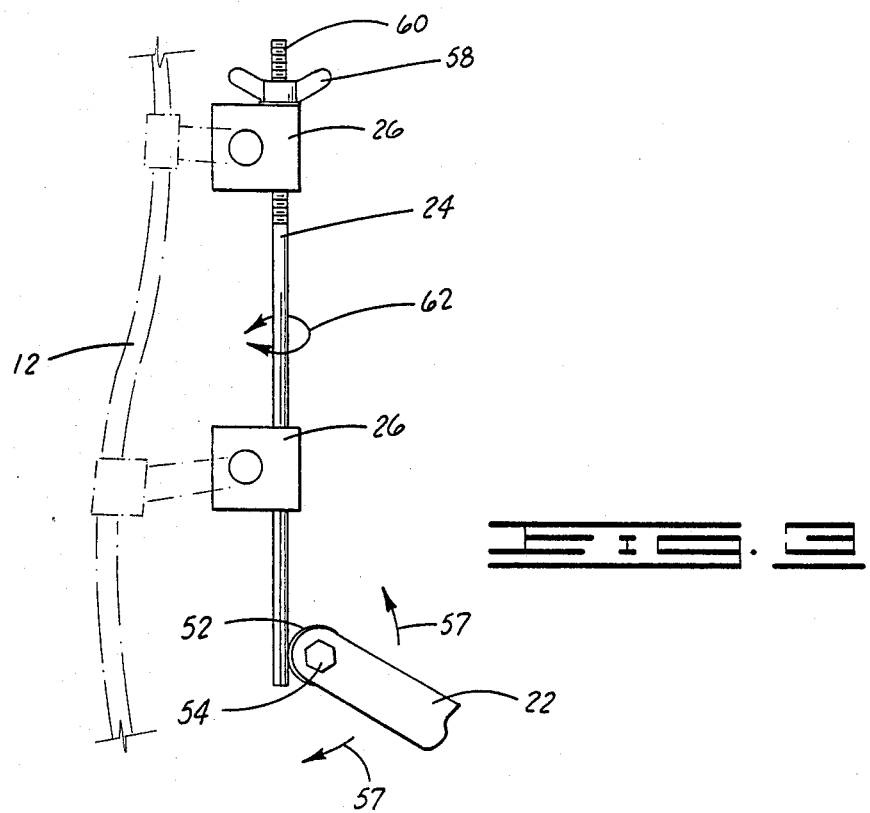
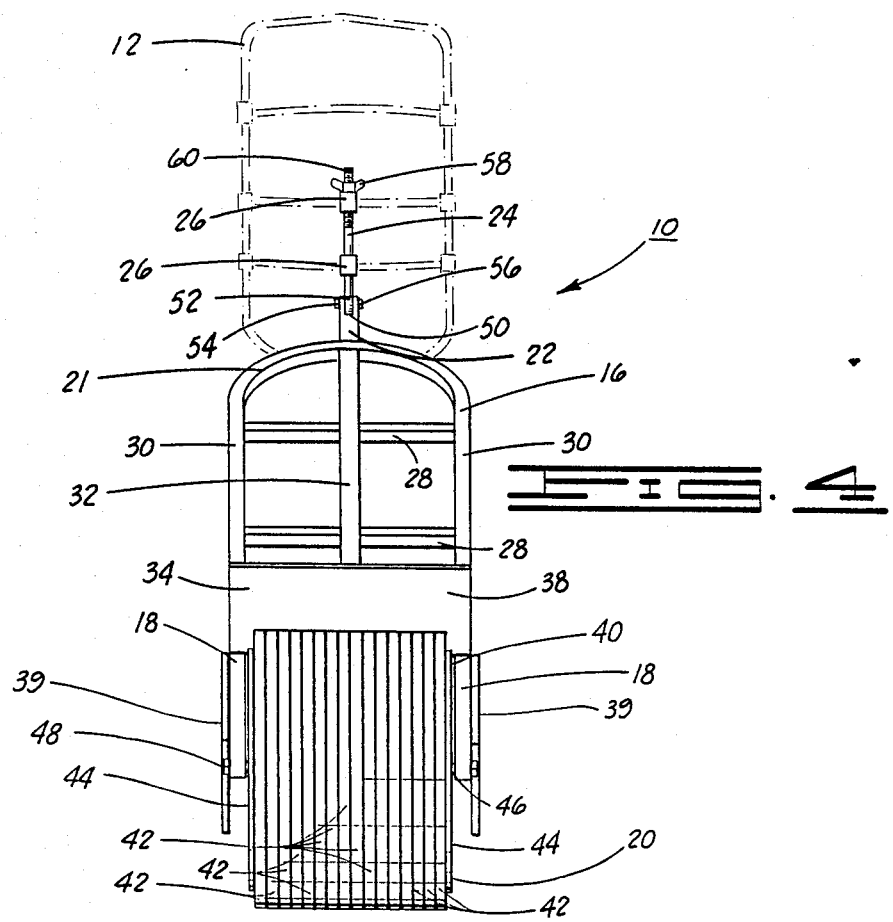

ROLLING TRAVOIS

BACKGROUND OF THE INVENTION

1. Field of the Invention

The present invention relates generally to a travois for hauling supplies and the like, and more particularly but not by way of limitation, to a rolling travois adapted for attachment to a backpack frame worn by an individual with the rolling travois pulled therebehind.

2. Brief Description of the Prior Art

Heretofore there have been different types of game carriers and carts pulled behind an individual using a belt or harness attachment. U.S. Pat. No. 2,624,588 to Jones and U.S. Pat. No. 2,992,834 to Tidwell et al. describes hand operated game carriers. In U.S. Pat. No. 2,613,953 to Giovannoni and U.S. Pat. No. 4,045,040 to Fails, a harness and backpack are used for pulling game carriers therebehind. While these carriers use a frame for carrying game with the frame mounted on a single wheel or dual wheels, the structure of the carriers is dissimilar when compared to the rolling travois of the present invention.

Various types of carts, such as a golf cart and a luggage cart, are described in U.S. Pat. No. 3,328,043 to Johnson and U.S. Pat. No. 4,236,723 to Lemmon, wherein a cart is pulled behind an individual wearing a belt attached to the cart. Further, a single wheeled cart for carrying a tree trimming apparatus is described in U.S. Pat. No. 2,655,957 to Lagant.

None of these carts are similar in structure to the subject rolling travois or provide the advantages as described herein.

SUMMARY OF THE INVENTION

The present invention provides a rolling travois having an elongated support frame mounted on a single wheel made up of a plurality of individual disks, the support frame having an outwardly extending tongue which is swivelly attached to a backpack frame using a backpack swivel connecting rod supported thereby. The frame is adjustably mounted on the connecting rod for providing a selected angle between the ground surface and the length of the support frame to more evenly distribute the load on the backpack frame when pulling the travois.

The wheel, also sometimes referred to herein as a roller, comprises a plurality of round disks supported on a common axle and which are disposed thereon to determine a selected shape of the outer periphery of the wheel.

An object of the subject invention is to provide a a modern lightweight rolling travois having a frame mounted on a single roller. The frame is attached to a backpack frame worn by an individual and pulled therebehind.

Another object of the invention is to provide a rolling travois having a single roller frame for hauling supplies and the like over various types of terrain under different weather conditions.

Yet another object of the invention is to provide a rolling travois which is attachably supported for even load distribution on an individuals back, the rolling travois being disposed to easily swivel up or down and left or right when pulled over rough terrain.

Other objects, advantages and features of the present invention will become clear from the following detailed description when read in conjunction with the drawing and appended claims.

BRIEF DESCRIPTION OF THE DRAWINGS

FIG. 3 illustrates an enlarged side view of a backpack swivel connecting rod connected to a tongue of the travois and clamped to the backpack frame.

FIG. 4 is an end view of the rolling travois connected to the backpack frame.

DESCRIPTION

Figure 1:
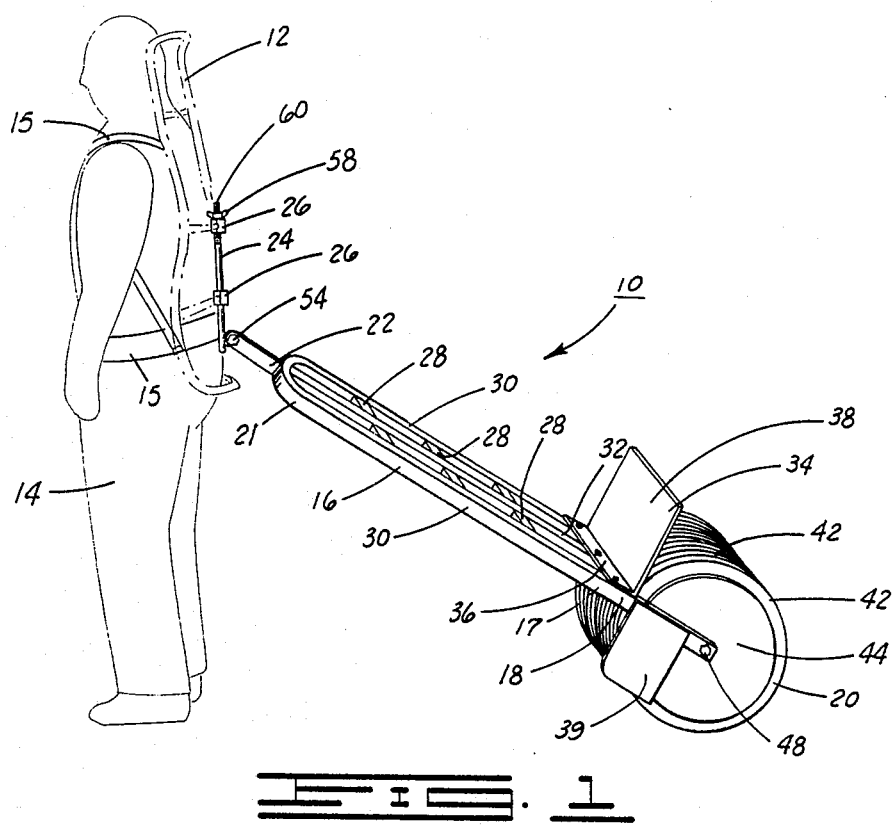
FIG. 1 illustrates the rolling travois attached to a backpack frame worn by an individual.

Referring now to the drawings, and more particularly to FIG. 1, shown therein is a side view of a rolling travois constructed in accordance with the present invention and designated by general reference number 10. The travois 10 is connected to a backpack frame 12 strapped to an individual 14 via a harness 15. The backpack frame 12 serves to spread the load on the back of the individual 14 when pulling the travois 10, and the waist belt and shoulder harness 15 can be any convenient arrangement of straps or the like to attach the backpack frame 12 to the individual 14.

The travois 10 includes a U-shaped lightweight metal support frame 16 with a lower open end 17 of the support frame 16 having legs 18 for receiving an enlarged wheel or roller 20 therebetween. An upper end 21 of the support frame 16 includes an outwardly extending tongue 22 which is pivotally attached to a backpack swivel connecting rod 24. The connecting rod 24 is connected to the support frame 16 using upper and lower clamps 26.

The support frame 16 shown in FIGS. 1 and 4 includes a plurality of cross struts 28 joining together opposite sides 30 of the support frame 16 and a center support strap 32 extending from the upper end 21 to the lower open end 17 and attached to a portion of the top of the cross struts 28. Attached to the sides 30 and a portion of the lower end of the center support strap 32 and the lowest cross strut 28 is an L-shaped upright backstop 34. The backstop 34, shown in FIGS. 1, 2 and 4, includes a shorter horizontal flange 36 which is attached to the support frame 16, and an elongated vertical flange 38. The vertical flange 38 allows articles to be placed thereagainst when stored on top of the support frame 16 and acts as a backstop to prevent articles from slipping downward on the support frame 16 and engaging the roller 20 when the travois 10 is in use. Also, the backstop 34 prevents water or mud from splashing from the roller 20 onto stored articles on the support frame 16.

An added feature of the rolling travois 10 is the use of downwardly extending snow keels 39 attached to the legs 18. The snow keels 39 add stability to the rolling travois 10 in snow and help prevent the travois 10 from sliding sideways on side hill traverses by knifing into packed snow or crusted ice.

Referring now to FIGS. 1 and 4, the roller 20 is shown disposed in an opening 40 between the legs 18 of the support frame 16. The roller 20 is made up of a plurality of cylindrically shaped rubber disks 42 having the same diameter and disposed together between two metal hubs 44. The round disks 42 rotate on a steel axle 46 which is preferably surrounded by a nylon bushing (not shown) received through the center of each disk 42. The axle 46 is secured to the legs 18 using bolts 48. The roller 20, made up of the round rubber disks 42, has proven more stable than using an annular shaped ball, inflatable tire or round ball wheel. Further, the disks 42 apply a greater load-bearing surface on the ground, and thus the travois 10 will travel better over snow, sand and mud.

In FIG. 4 the tongue 22 is shown as having a forked end portion 50 used for pivotal attachment to a pivot support member 52 attached to the lower end of the connecting rod 24. A threaded bolt 54 is received through holes in the forked end portion 50 and through an aperture in the support member 52 and secured to a nut 56. Using the above type of connection the tongue 22 swivels up and down on the support member 52 as depicted by arrows 57 in FIG. 3, thereby allowing easy up and down movement of the travois 10 as it is pulled.

Figure 2:
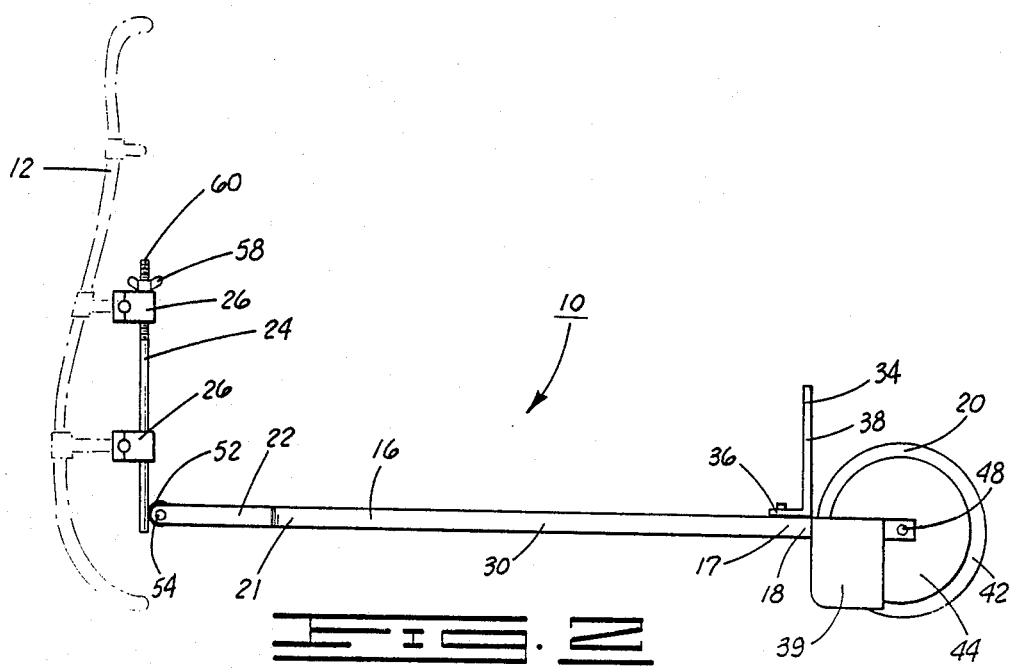
FIG. 2 shows a side view of the travois with the backpack frame resting on a ground surface.

As shown in FIG. 2, the swivel connection of the tongue 22 to the backpack frame 12 permits placement of backpack frame 12 on the ground surface when the support frame 16 is lowered into a horizontal position as shown. Supplies can be placed on the support frame 16 while in its horizontal position and secured thereto using a rope or bungies as desired.

In the interest of ease in pulling the travois 10 without tiring or hurting the back of the individual 14, the angle between the horizontal ground surface and the longitudinal axis of the support frame 16 can be adjusted by raising the connecting rod 24 by tightening a wing nut 58 on a threaded end portion 60 of the connecting rod 24. By loosening the wing nut 58, which bears against a washer 58A on top of the upper clamp 26, the connecting rod 24 can be lowered. This provides for vertical adjustment of the attaching position of the upper end 21 (or tongue 22) of the support frame 16 relative to the backpack frame 12 along the longitudinal axis thereof. This adjustment will vary with the size and height of the individual 14 and the load carried on the support frame 16.

FIG. 3 illustrates an enlarged side view of the backpack swivel connecting rod 24. The clamps 26 are rigidly secured to the backpack frame 12 but allow the connecting rod 26 to pivot either to the left or right as indicated by arrow 62.

In FIG. 4 a rear view of the rolling travois 10 is shown with the tongue 22 secured to the connecting rod 24 which is secured to the rear of the backpack frame 12. In this view the multiple rubber disks 42 are shown which make up the particular configuration of the roller 20. The contour of roller 20 can be altered, if desired, by substituting different size disks 42 to make up a selected wheel profile for a particular type of terrain or ground surface on which the rolling travois 10 will be used.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A rolling travois for carrying camping supplies and the like, the rolling travois adapted to be connected to an individual, the rolling travois comprising:

an elongated U-shaped support frame having an upper end with a tongue extending outwardly therefrom with a pivot attachment means thereat and a lower end having a pair of support frame legs extending outwardly therefrom;

an enlarged roller rotatably mounted on said pair of support frame legs extending outwardly from said lower end of said support frame, said roller comprising a plurality of cylindrically shaped disks supported between said support frame legs; and attaching means for attaching said support frame to said individual so that said individual can pull said support frame behind said individual, said attaching means comprising a backpack swivel connecting rod having a pivot support member at one end thereof said tongue extending outwardly from the upper end of said support frame and pivotally connected to said pivot support member on said connecting rod.

2. The rolling travois of claim 1 further including a backstop mounted near said lower end of said frame and extending upwardly therefrom.

3. The rolling travois of claim 2 wherein attaching means comprises a backpack frame and wherein said backpack swivel connecting rod includes height adjustment means for raising and lowering said connecting rod on said backpack frame.

4. The rolling travois of claim 3 further comprising snow keels attached to said support frame legs of said frame and extending downwardly in near disposition to each side of said enlarged roller.

5. A rolling travois for carrying camping supplies and the like, the rolling travois adapted for connecting to an individual, the rolling travois comprising:

an elongated support frame having an upper end with a tongue extending outwardly therefrom and a lower end having a pair of legs extending outwardly therefrom;

a backstop mounted on said lower end of said frame and extending upwardly therefrom;

an enlarged roller made up of a plurality of individual cylindrical disks, said enlarged roller mounted on said pair of legs extending outwardly from said lower end of said frame; and backpack means attachable to the individual for connecting said tongue of said support frame to said individual, said backpack means comprising a backpack frame and a backpack swivel connecting rod supported by said backpack frame, said connecting rod having a height adjustment means for raising and lowering said connecting rod on said backpack frame.

6. The rolling travois of claim 5 further comprising snow keels attached to each of said pair of legs of the said frame and extending downwardly in near disposition to each side of said enlarged roller.

7. A rolling travois for carrying camping supplies and the like, the rolling travois adapted for connection to an individual, the rolling travois comprising:

a backpack frame having a longitudinal axis attachable to the back of the individual;

means for attaching said backpack frame to said individual;

an elongated support frame having an upper end and a lower end; said lower end having a pair of support frame legs an enlarged roller rotatably mounted on said lower end of said support frame, said enlarged roller comprising a plurality of individual disks; and swivel attachment means for connecting said upper end of said support frame to said backpack frame, said swivel attachment means permitting vertical adjustment of said position of the upper end of said support frame relative to said backpack frame along said longitudinal axis thereof and said swivel attachment means including a backpack swivel connecting rod supported by said backpack frame, said connecting rod having a pivot support member attached thereto, said upper end of said support frame having a tongue member extending therefrom, and means for pivotally connecting said tongue member to said pivot support member.

8. The rolling travois of claim 7 further comprising snow keels attached to each of said legs of said frame and extending downwardly in near disposition to each side of said enlarged roller.

* * * * *